US009792880B2

(12) United States Patent
Im et al.

(10) Patent No.: US 9,792,880 B2
(45) Date of Patent: Oct. 17, 2017

(54) DISPLAY DEVICE

(71) Applicant: Samsung Display Co., Ltd., Yongin, Gyeonggi-Do (KR)

(72) Inventors: Wan Soon Im, Cheonan-si (KR); Yun Seok Lee, Asan-si (KR); Jong Hak Hwang, Yongin-si (KR)

(73) Assignee: Samsung Display Co., Ltd. (KR)

( * ) Notice: Subject to any disclaimer, the term of this patent is extended or adjusted under 35 U.S.C. 154(b) by 146 days.

(21) Appl. No.: 14/696,105

(22) Filed: Apr. 24, 2015

(65) Prior Publication Data

US 2016/0189675 A1 Jun. 30, 2016

(30) Foreign Application Priority Data

Dec. 26, 2014 (KR) ........................ 10-2014-0190802

(51) Int. Cl.
| | | |
|---|---|---|
| *G02F 1/1335* | (2006.01) | |
| *G09G 5/02* | (2006.01) | |
| *G02F 1/13* | (2006.01) | |
| *G09G 3/36* | (2006.01) | |

(52) U.S. Cl.
CPC .............. *G09G 5/026* (2013.01); *G02F 1/13* (2013.01); *G09G 3/3648* (2013.01); *G09G 2300/0447* (2013.01); *G09G 2300/0452* (2013.01)

(58) Field of Classification Search
CPC ... G09G 2300/0452; G09G 2300/0447; G09G 3/3648; G09G 5/026; G02F 1/13; G02F 1/133609; G02F 2001/136222; G02F 1/133514
See application file for complete search history.

(56) References Cited

U.S. PATENT DOCUMENTS

| | | | |
|---|---|---|---|
| 2010/0053043 A1* | 3/2010 | Sakamoto | ........... H01L 27/3213 345/77 |
| 2010/0085515 A1* | 4/2010 | Kim | .................... G02F 1/13394 349/106 |
| 2011/0102716 A1* | 5/2011 | Park | .................. G02F 1/133514 349/106 |
| 2012/0206512 A1 | 8/2012 | Kim et al. | |
| 2015/0090970 A1* | 4/2015 | Park | ...................... H01L 27/322 257/40 |
| 2015/0123083 A1* | 5/2015 | Xi | ......................... H01L 27/322 257/40 |

FOREIGN PATENT DOCUMENTS

| | | |
|---|---|---|
| KR | 1010641910000 | 4/2005 |
| KR | 1020070037114 A | 4/2007 |
| KR | 1011465240000 | 5/2012 |

* cited by examiner

*Primary Examiner* — Nathanael R Briggs
(74) *Attorney, Agent, or Firm* — Innovation Counsel LLP

(57) ABSTRACT

A display device according to an exemplary embodiment includes: a plurality of color filters positioned at a plurality of color pixels and representing different colors; and a transparent layer positioned at a white pixel and including a green colorant and a blue colorant, wherein white color coordinates represented by the white pixel are substantially equal to white color coordinates represented together by the plurality of color pixels.

19 Claims, 13 Drawing Sheets

|  |  | W_RGB | W_only | W+GB | RGB+(W+GB) |
|---|---|---|---|---|---|
| Color coordinate | x | 0.322 | 0.335 | 0.322 | 0.322 |
|  | y | 0.346 | 0.335 | 0.346 | 0.346 |

DISPLAY DEVICE

CROSS-REFERENCE TO RELATED APPLICATION

This application claims priority to and the benefit of Korean Patent Application No. 10-2014-0190802 filed in the Korean Intellectual Property Office on Dec. 26, 2014, the entire contents of which are incorporated herein by reference.

BACKGROUND (a) Technical Field

The present application relates to a display device. More particularly, the present application relates to a display device including a white pixel.

(b) Description of the Related Art

In general, display devices, such as liquid crystal displays (LCDs) and organic light emitting diode displays, include a display substrate having a plurality of pixels including switching elements and a plurality of signal lines, a data driver applying, as a data signal, a gray voltage corresponding to an input image signal among a plurality of gray voltages to data lines, and the like.

The display device includes a self-emissive display device having a light-emitting device emitting light and a non-emissive display device including a backlight.

As a representative example of the non-emissive display device, the liquid crystal display is one of the display devices that are widely used. The liquid crystal display includes a display panel including a plurality of pixels, and a backlight unit supplying the light to the display panel. The display panel includes a liquid crystal layer having dielectric anisotropy, and field generating electrodes such as a pixel electrode and a common electrode generating an electric field to the liquid crystal layer. The pixel electrode may be arranged in a matrix shape and may be connected to the switching element such as a thin film transistor (TFT) to sequentially receive a data voltage row by row. The common electrode is applied with a common voltage Vcom. The pixel electrode and the common electrode are applied with the voltages to generate the electric field to the liquid crystal layer, and an intensity of the electric field is controlled to control the transmittance of the light passing through the liquid crystal layer, thereby obtaining the desired image.

Two field generating electrodes such as the pixel electrode and the common electrode may be positioned at one display panel or may be respectively positioned at two display panels. When the display device includes two display panels, the pixel electrodes applied with a data voltage among the field generating electrodes and a plurality of thin film transistors may be arranged in one display panel of two facing display panels and a color filter representing primary colors such as red, green, and blue and a light blocking member preventing light leakage between the pixel may be formed in the other display panel. Alternatively, the light blocking member may be formed at the same display panel as the pixel electrode and the thin film transistor, in this case, the color filter may also be formed at the same display panel as the pixel electrode.

The non-emissive display device includes a red pixel, a green pixel, and a blue pixel respectively displaying images of three primary colors such as red, green, and blue. The red pixel, the green pixel, and the blue pixel display each primary color to realize various colors. However, the red pixel, the green pixel, and the blue pixel include a colored filter such that a light amount emitted from the backlight is reduced while passing through the color filter, and resultantly the luminance of the image is deteriorated. To solve this problem, a white pixel that does not include the colored filter is further included as well as the color pixels representing the primary colors such as three primary colors to pass more of the light of the backlight than the color pixel. The white pixel does not include the color filter such that the luminance of the image may be increased.

The above information disclosed in this Background section is only for enhancement of understanding of the background and therefore it may contain information that does not form the prior art that is already known in this country to a person of ordinary skill in the art.

SUMMARY

When the display device includes the white pixel, the white may be displayed by the white pixel, or by emitting the light by the plurality of color pixels such as the red pixel, the green pixel, and the blue pixel.

The inventive concept substantially accords the color coordinates of the white represented by the plurality of color pixels such as the red pixel, the green pixel, and the blue pixel with the white color coordinates of the white represented by the white pixel.

A display device according to an exemplary embodiment includes: a plurality of color filters positioned at a plurality of color pixels and representing different colors; and a transparent layer positioned at a white pixel and including a green colorant and a blue colorant, wherein the white color coordinates represented by the white pixel are substantially equal to the white color coordinates represented together by the plurality of color pixels.

A ratio of the green colorant and the blue colorant included in the transparent layer may be about 1.5:1 to about 2.5:1.

The green colorant included in the transparent layer may range from about 6.8 wt % to 7.5 wt % of the transparent layer.

The blue colorant included in the transparent layer may range from about 3.1 wt % to 3.46 wt % of the transparent layer.

The plurality of color filters may include a red color filter representing red, a green color filter representing green, and a blue color filter representing blue, an amount of the green colorant included in the transparent layer may be smaller than an amount of a green colorant included in the green color filter, and an amount of a blue colorant included in the transparent layer may be smaller than the amount of the blue colorant included in the blue color filter.

A substrate and a plurality of signal lines positioned on the substrate may be further included, the plurality of color pixels and the white pixel each may include at least one thin film transistor connected to the plurality of signal lines, and the plurality of color filters and the transparent layer may be positioned on the thin film transistors.

A first substrate and a second substrate facing each other and a plurality of signal lines positioned on the first substrate may be further included, wherein the plurality of color pixels and the white pixel each may include at least one thin film transistor connected to the plurality of signal lines, and the plurality of color filters and the transparent layer are positioned on the second substrate.

According to an exemplary embodiment, the color coordinates of the white represented together by the plurality of color pixels such as the red pixel, the green pixel, and the blue pixel are substantially equal to the white color coordinates of the white represented by the white pixel such that the color quality of the displayed image may be increased. Also, the color variation depending on the viewing angle of the display device is reduced such that the lateral visibility may be improved.

DETAILED DESCRIPTION OF THE EMBODIMENTS

Figure 1:
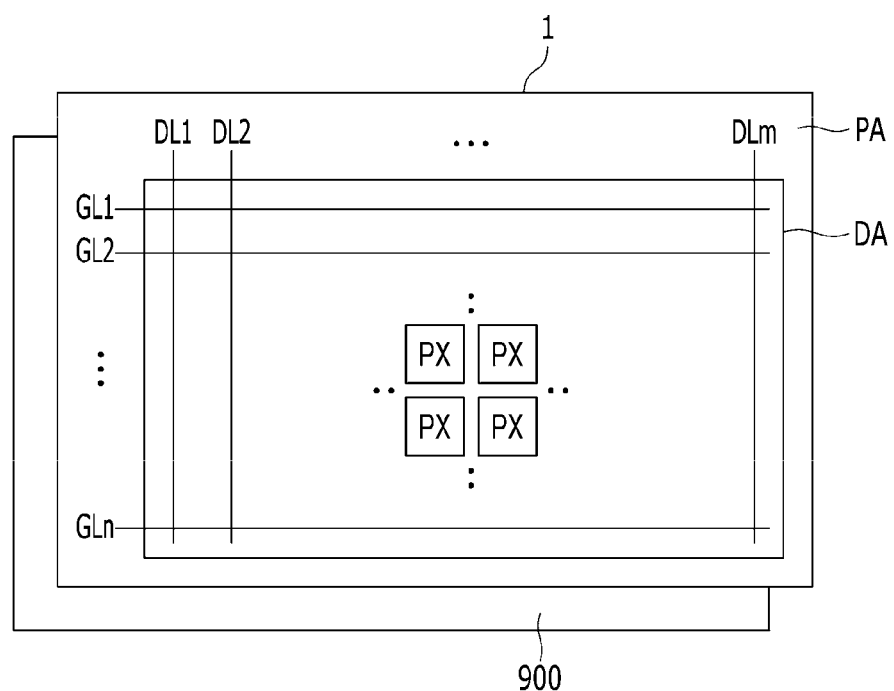
FIG. 1 is a schematic layout view of a display device according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

To clearly describe the inventive concept, parts that are irrelevant to the description are omitted, and like numerals refer to like or similar constituent elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

First, a display device according to an exemplary embodiment will be described with reference to FIG. 1 to FIG. 3.

Figure 2:
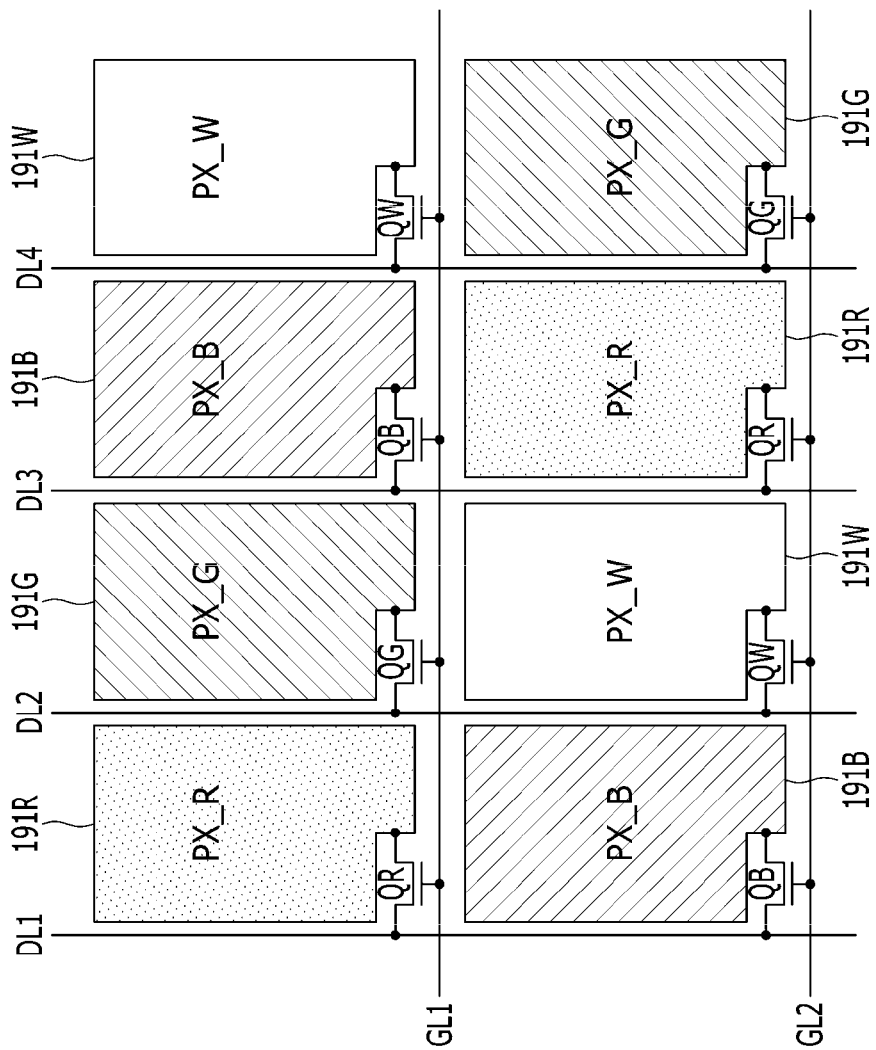
FIG. 2 is a layout view of a plurality of pixels included in a display device according to an exemplary embodiment.
Figure 3:
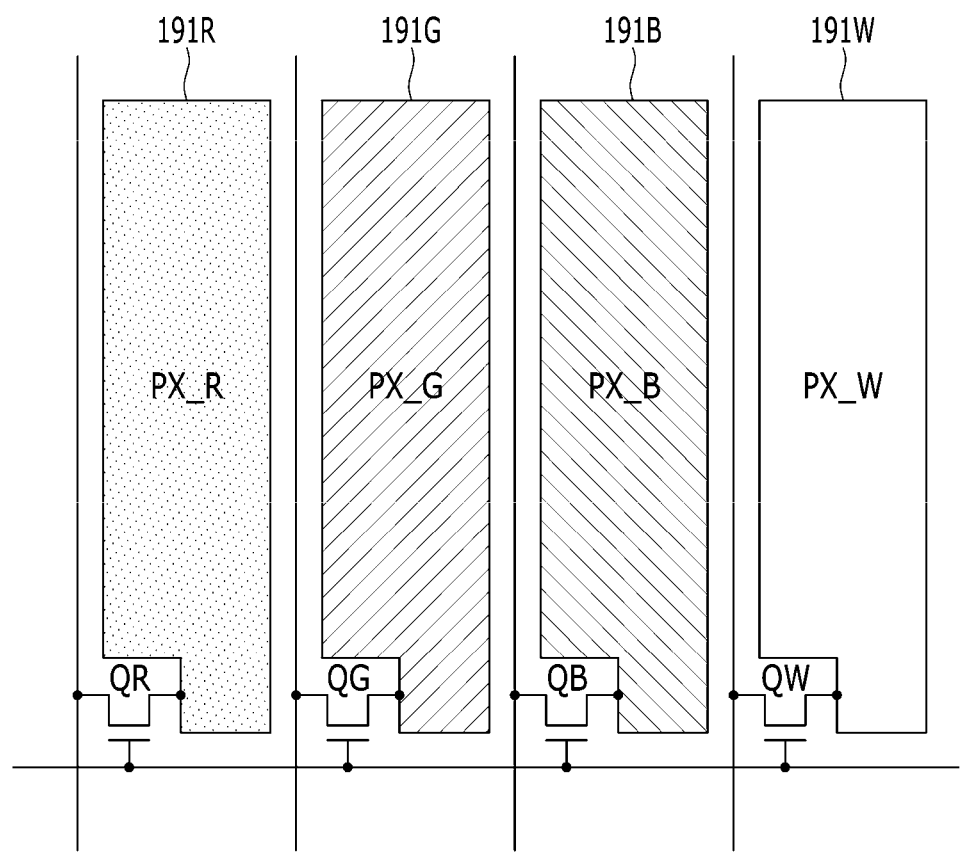
FIG. 3 is a layout view of a plurality of pixels included in a display device according to an exemplary embodiment.

FIG. 1 is a schematic layout view of a display device according to an exemplary embodiment, FIG. 2 is a layout view of a plurality of pixels included in a display device according to an exemplary embodiment, and FIG. 3 is a layout view of a plurality of pixels included in a display device according to an exemplary embodiment.

Referring to FIG. 1, a display device according to an exemplary embodiment may include a display panel 1 and a backlight unit 900 positioned behind the display panel 1. The backlight unit 900 may include a backlight (not shown) emitting light and at least one optical film (not shown) improving an optical characteristic.

The display panel 1 may include a display area DA as a region displaying an image and a peripheral area PA positioned at a circumference of the display area DA. The display area DA may include a plurality of signal lines GL1, GL2, ..., GLn, DL1, DL2, ..., DLm and a plurality of pixels PX connected thereto. The plurality of pixels PX may be arranged in an approximate matrix, however it is not limited thereto.

Referring to FIG. 2, the signal lines may include a plurality of gate lines GL1, GL2, ..., GLn transmitting a gate signal and a plurality of data lines DL1, DL2, ..., DLm transmitting a data voltage. The gate lines GL1, GL2, ..., GLn mainly extend in a horizontal direction and the data lines DL1, DL2, ..., DLm may extend in a vertical direction thereby crossing the gate lines GL1, GL2, ..., GLn.

The signal lines GL1, GL2, ..., GLn, DL1, DL2, ..., DLm may be made of a metal or opaque or transparent conductors, for example, an aluminum-based metal such as aluminum (Al) or an Al alloy, a silver-based metal such as silver (Ag) or an Ag alloy, a copper-based metal such as copper (Cu) or a Cu alloy, a molybdenum-based metal such as molybdenum (Mo) or a Mo alloy, chromium (Cr), tantalum (Ta), or titanium (Ti).

Referring to FIG. 2, a plurality of pixels PX include a plurality of color pixels PX_R, PX_G, and PX_B and a white pixel PX_W.

The plurality of color pixels PX_R, PX_G, and PX_B may display one of three primary colors such as red, green, and blue, or four primary colors. The primary colors are not limited to the three primary colors such as red, green, and blue, and may be cyan, magenta, and yellow. In the present exemplary embodiment, the plurality of color pixels PX_R, PX_G, and PX_B include a red pixel PX_R representing red, a green pixel PX_G representing green, and a blue pixel PX_B representing blue.

The plurality of color pixels such as the red pixel PX_R, the green pixel PX_G, and the blue pixel PX_B display each of the primary colors and thus a desired color may be recognized by a spatial sum of the primary colors, thereby displaying full colors.

The white pixel PX_W uniformly passes light of almost the entire visible ray wavelength band instead of passing through the light of one band, thereby displaying the image of the white color. The white pixel PX_W has a function of improving color reproducibility of the display device and enforcing the luminance.

Each of the pixels PX_R, PX_G, PX_B, and PX_W may include at least one switching element QR, QG, QB, and QW connected to at least one data line DL and at least one gate line GL, and at least one pixel electrode 191R, 191G, 191B, and 191W connected thereto. The switching elements QR, QG, QB, and QW may include at least one thin film transistor. The thin film transistor is controlled depending the gate signal transmitted by the gate lines GL1, GL2, . . . , GLn such that the data voltage transmitted by the data lines DL1, DL2, . . . , DLm is transmitted to the pixel electrodes 191R, 191G, 191B, and 191W.

The arrangement of the plurality of color pixels PX_R, PX_G, and PX_B_and the white pixel PX_W may be variously determined.

Referring to FIG. 2, the plurality of color pixels PX_R, PX_G, and PX_B and the white pixel PX_W may be disposed in an approximate quadrangle matrix. For example, the red pixel PX_R and the white pixel PX_W may be disposed to be adjacent in the diagonal direction, and the green pixel PX_G and the blue pixel PX_B may be disposed to be adjacent in the diagonal direction. Also, the red pixel PX_R and the blue pixel PX_B may be adjacent in the column direction, and the green pixel PX_G and the white pixel PX_W may be adjacent in the column direction. In addition, the red pixel PX_R and the green pixel PX_G may be adjacent in the row direction, and the blue pixel PX_B and the white pixel PX_W may be adjacent in the row direction The arrangement of the three color pixels PX_R, PX_G, and PX_B and the white pixel PX_W that are arranged in one 2×2 quadrangle matrix may be uniform, and may be different depending on the position as shown in FIG. 2. Referring to FIG. 2, in one region, when the red pixel PX_R and the green pixel PX_G are positioned on the blue pixel PX_B and the white pixel PX_W, the red pixel PX_R and the green pixel PX_G may be positioned under the blue pixel PX_B and the white pixel PX_W in the adjacent region. However, the pixel arrangement is not limited thereto and may be variously changed.

Each of the pixels PX_R, PX_G, PX_B, and PX_W includes a transmission region where the light is transmitted to display the image. Most of the pixel electrodes 191R, 191G, 191B, and 191W may be positioned at the transmission region. The transmission region of the pixels PX_R, PX_G, PX_B, and PX_W may be defined by a light blocking member preventing light leakage. That is, the transmission region of the pixels PX_R, PX_G, PX_B, and PX_W is not covered by the light blocking member among the display area DA of the display panel 1 to be defined as the region displaying the image.

Referring to FIG. 3, the plurality of color pixels PX_R, PX_G, and PX_B and the white pixel PX_W may be disposed in one column. For example, the color pixels of the red pixel PX_R, the green pixel PX_G, and the blue pixel PX_B, and the white pixel PX_W, may be sequentially disposed in the row direction. At least one of the size and the shape of the red pixel PX_R, the green pixel PX_G, the blue pixel PX_B, and the white pixel PX_W may be the same, however it is not limited thereto.

Next, the display device according to an exemplary embodiment will be described with reference to FIG. 4 to FIG. 6 along with the above-described drawings.

Figure 4:
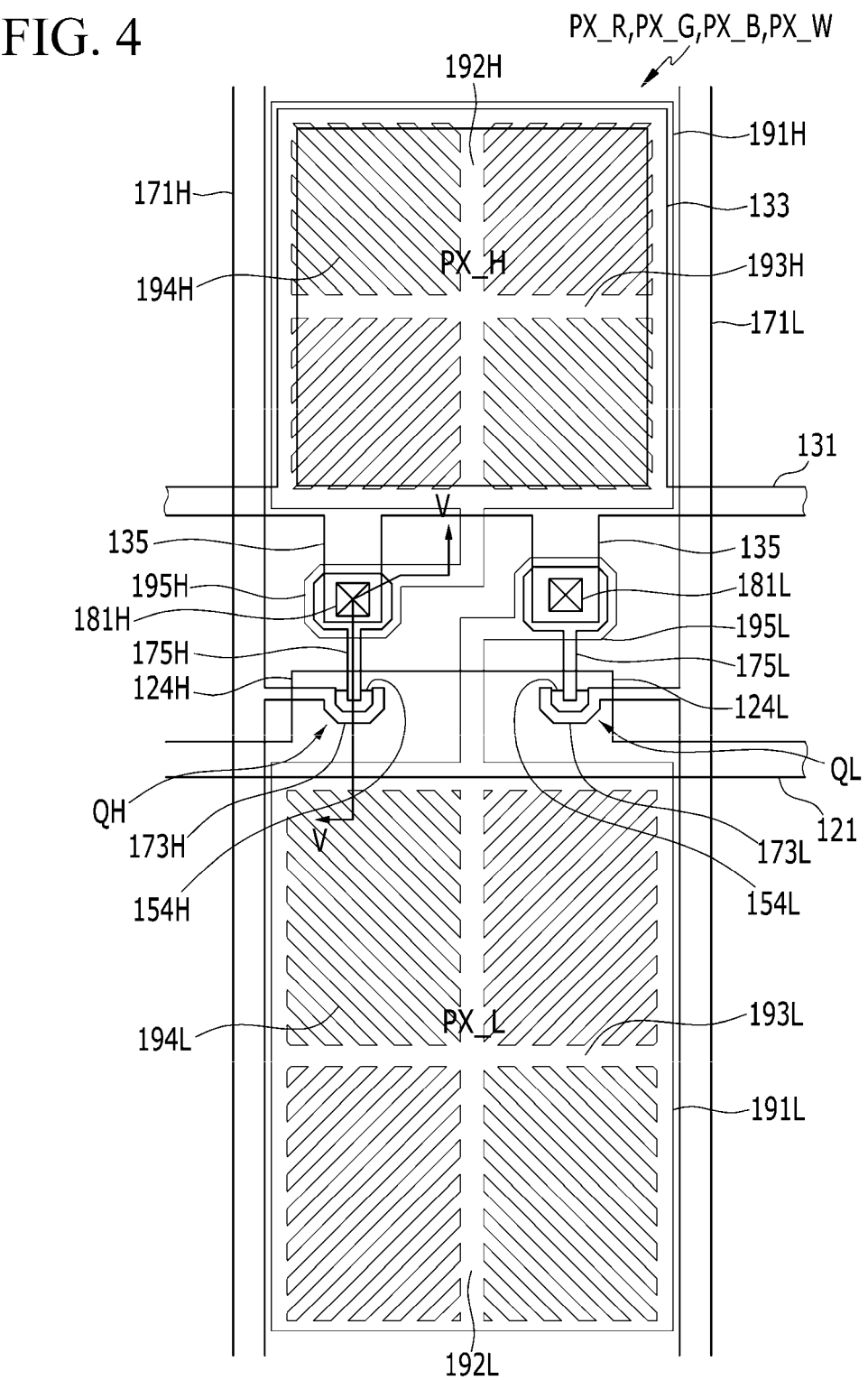
FIG. 4 is a layout view for one pixel of a display device according to an exemplary embodiment.
Figure 5:
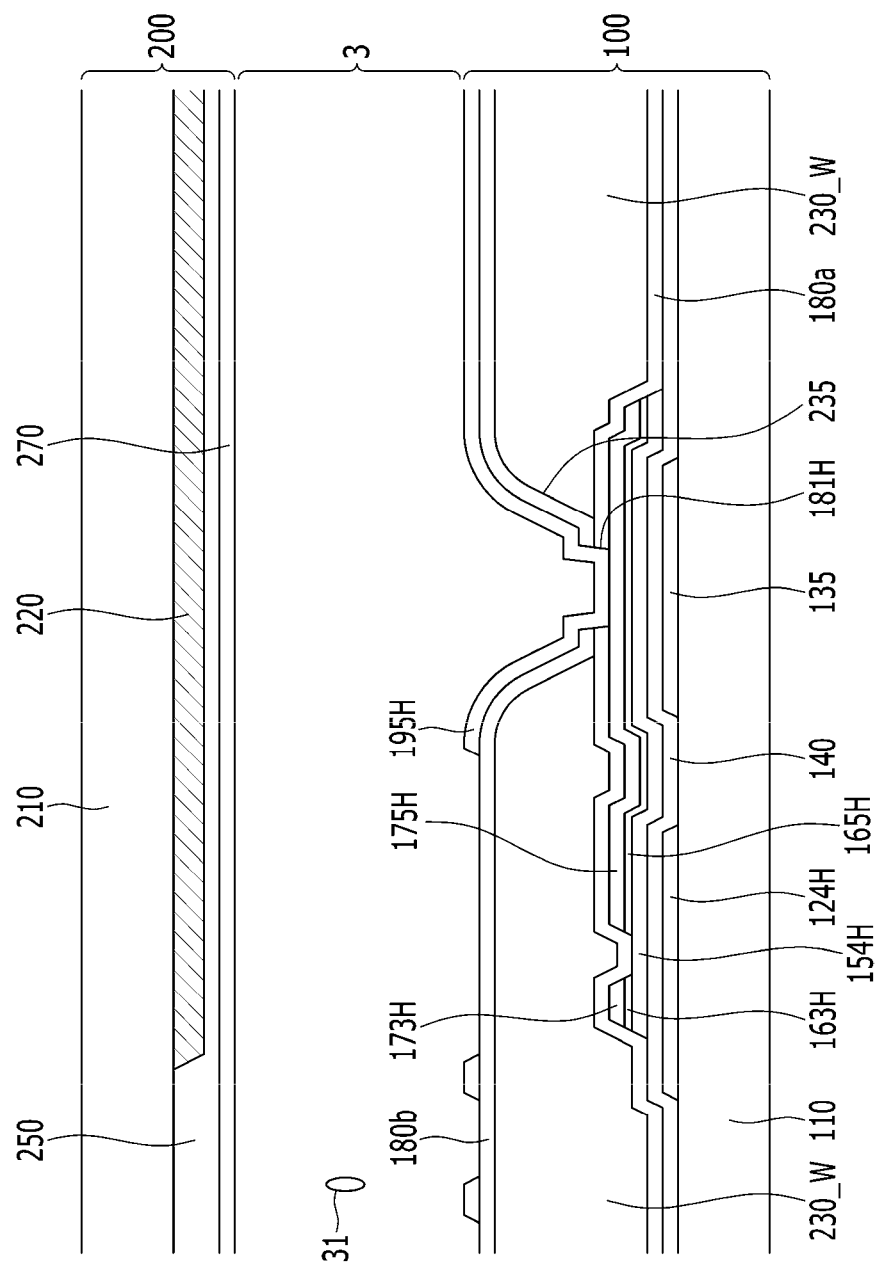
FIG. 5 is a cross-sectional view of the display device taken along a line V-V of FIG. 4 when a pixel of the display device shown in FIG. 4 is a white pixel.
Figure 6:
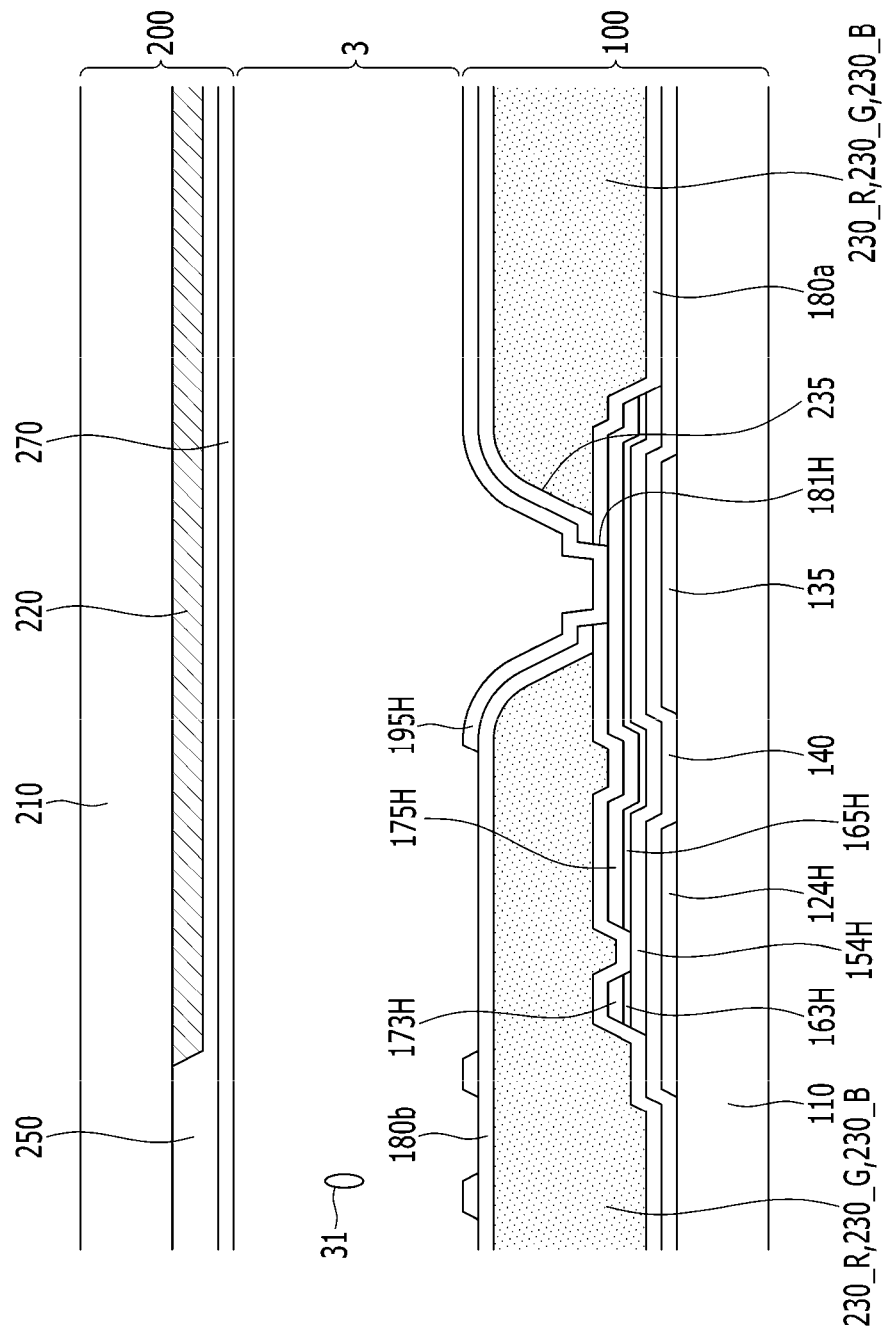
FIG. 6 is a cross-sectional view of the display device taken along a line V-V of FIG. 4 when a pixel of the display device shown in FIG. 4 is a color pixel.

FIG. 4 is a layout view for one pixel of a display device according to an exemplary embodiment, FIG. 5 is a cross-sectional view of the display device taken along a line V-V of FIG. 4 when a pixel of the display device shown in FIG. 4 is a white pixel, and FIG. 6 is a cross-sectional view of the display device taken along a line V-V of FIG. 4 when a pixel of the display device shown in FIG. 4 is a color pixel.

The display device according to an exemplary embodiment as the liquid crystal display includes a lower panel 100 and an upper panel 200 facing each other, and a liquid crystal layer 3 interposed therebetween.

First, referring to the lower panel 100, a gate conductor including a gate line 121 and a storage electrode line 131 is positioned on a substrate 110 including an insulating material such as glass or plastic.

The gate line 121 may extend mainly in a row direction and transmits a gate signal. The gate line 121 may include a first gate electrode 124H and a second gate electrode 124L protruding upward and downward. The first gate electrode 124H and the second gate electrode 124L may be connected to each other, thereby forming one protrusion. However, the shape of the first gate electrode 124H and the second gate electrode 124L may be variously changed.

The storage electrode line 131 extends in parallel to the gate line 121 and is separated from the gate line 121. The storage electrode line 131 may include storage electrodes 133 and 135.

The storage electrode 133 is protruded on the storage electrode line 131 extending in the row direction, thereby forming a ring shape. The storage electrode 133 may be omitted.

The storage electrode 135 may be protruded upwardly or downwardly from the storage electrode line 131 extending in the row direction. FIG. 4 shows an example in which the storage electrode line 131 includes a pair of storage electrodes 135 for one of the pixels PX_R, PX_G, PX_B, and PX_W. A pair of storage electrodes 135 may extend toward the first gate electrode 124H and the second gate electrode 124L, respectively.

A gate insulating layer 140 is positioned on the gate conductor. The gate insulating layer 140 may be formed of an inorganic insulating material such as a silicon nitride (SiNx) and a silicon oxide (SiOx). The gate insulating layer 140 may be made of a single layer or a multilayer.

A first semiconductor 154H and a second semiconductor 154L are positioned on the gate insulating layer 140. The first semiconductor 154H may be positioned on the first gate electrode 124H and the second semiconductor 154L may be positioned on the second gate electrode 124L.

The first semiconductor 154H and the second semiconductor 154L may include amorphous silicon, polycrystalline silicon, or a metal oxide.

Ohmic contacts 163H and 165H may be further positioned on the first semiconductor 154H and the second semiconductor 154L. The ohmic contacts may be formed on the first semiconductor 154H, and they may be formed of a material such as n+ hydrogenated amorphous silicon in which an n-type impurity is doped at a high concentration, or of a silicide. The ohmic contacts 163H and 165H may be omitted.

A data conductor including a plurality of data lines including a first data line 171H and a second data line 171L, a plurality of first drain electrodes, 175H, and a plurality of second drain electrodes 175L are formed on the ohmic contacts 163H and 165H, the first and second semiconductors 154H and 154L, and the gate insulating layer 140.

The first data line 171H and the second data line 171L transmit the data signal and mainly extend in the column direction, thereby crossing the gate line 121 and the storage electrode line 131.

The first data line 171H and the second data line 171L may respectively transmit the data voltages representing different luminance for one image signal. For example, the data voltage transmitted by the second data line 171L for the image signal of one gray may be lower than the data voltage transmitted by the first data line 171H, but it is not limited thereto.

The first data line 171H may include a first source electrode 173H protruded toward the first gate electrode 124H, and the second data line 171L may include a second source electrode 173L protruded toward the second gate electrode 124L.

The first drain electrode 175H and the second drain electrode 175L respectively include one end having a wide area and the other end having a bar shape. The wide portion of the first drain electrode 175H and the second drain electrode 175L may overlap the storage electrode 135 protruded under the storage electrode line 131. The bar end portion of the first drain electrode 175H and the second drain electrode 175L may be partially enclosed by the first source electrode 173H and the second source electrode 173L.

The wide end portion of the first drain electrode 175H may overlap one storage electrode 135, and the wide end portion of the second drain electrode 175L may overlap the other storage electrode 135.

The first gate electrode 124H, the first source electrode 173H, and the first drain electrode 175H form a first thin film transistor (TFT) QH along with the first semiconductor 154H, and the second gate electrode 124L, the second source electrode 173L, and the second drain electrode 175L form a second thin film transistor QL along with the second semiconductor 154L. The channel of the first and second thin film transistors (QH and QL) is formed in the semiconductors 154H and 154L between the source electrodes 173H and 173L and the drain electrodes 175H and 175L facing each other. The first and second thin film transistors QH and QL may function as a switching element transmitting the data voltage depending on the gate signal transmitted by the gate line 121.

Referring to FIG. 4, each of the pixels PX_R, PX_G, PX_B, and PX_W may include a first sub-pixel PX_H and a second sub-pixel PX_L positioned at different regions with respect to the first and second thin film transistors QH and QL.

A first insulating layer 180a is positioned on the data conductor. The first insulating layer 180a may be made of the organic insulating material or the inorganic insulating material and may include the single layer or the multilayer.

Referring to FIG. 5 and FIG. 6, a plurality of color filters 230_R, 230_G, and 230_B and a transparent layer 230_W may be positioned on the first insulating layer 180a. The color filters 230_R, 230_G, and 230_B and the transparent layer 230_W may be formed with substantially the same layer.

The color filters 230_R, 230_G, and 230_B may transmit light of a color having a predetermined wavelength, and may include a plurality of basic color filters for implementing a color display. An example of the basic color may include the three primary colors of red, green, and blue.

The color filters 230_R, 230_G, and 230_B are positioned at the color pixels PX_R, PX_G, and PX_B and may represent one of three primary colors of red, green, and blue or four primary colors. The color filters 230_R, 230_G, and 230_B are not limited to the three primary colors of red, green, and blue colors, and may display cyan, magenta, yellow, and white-based colors, and the like.

Each of the color filters 230_R, 230_G, and 230_B includes a pigment representing a color, and may include a binder, a photoinitiator, and an organic material such as a monomer. The colorant may be a pigment type.

For example, the red color filter 230_R includes a red colorant, the green color filter 230_G includes a green colorant, and the blue color filter 230_B includes a blue colorant. A ratio of the red colorant in the entire material of the red color filter 230_R, a ratio of the green colorant in the entire material of the green color filter 230_G, and a ratio of the blue colorant in the entire material of the blue color filter 230_B may be more than about 15%.

The transparent layer 230_W may include a portion that is positioned at the white pixel PX_W. The transparent layer 230_W prevents a step from being lower than other color pixels in the white pixel PX_W in which the color filter representing the primary colors is not positioned, thereby preventing a color variation depending on the viewing direction. The transparent layer 230_W changes the wavelength distribution of the light passing through the white pixel PX_W in the predetermined range determined depending on an exemplary embodiment, and maintains the color of the substantially passing light. That is, if the white light is incident to the transparent layer 230_W, the white light may be mainly emitted, and if the green light is incident, the green light may be mainly emitted. The transparent layer 230_W is referred to as a white color filter.

According to another exemplary embodiment, the transparent layer 230_W is formed on the entire surface of the substrate 110, thereby further including a portion positioned at the color pixels PX_R, PX_G, and PX_B. In this case, the transparent layer 230_W may be positioned on the color filters 230_R, 230_G, and 230_B. In this case, the transparent layer 230_W is referred to as an overcoat. Here, in the white pixel PX_W and the color pixels PX_R, PX_G, and PX_B, a high-planarization organic layer to reduce a difference of a cell gap of the liquid crystal layer 3 may be used.

The transparent layer 230_W includes a transparent organic material, and a green colorant and a blue colorant of a predetermined amount are further included. Accordingly, when the display device displays the image, the white color coordinate represented by the white pixel PX_W included in the transparent layer 230_W may be substantially the same as the white color coordinate represented by the plurality of color pixels PX_R, PX_G, and PX_B.

For this, the ratio of the green colorant and the blue colorant or the ratio of the green colorant and the blue colorant occupied in the entire transparent layer 230_W may be controlled. The ratio of a mass or a volume of the green colorant and the blue colorant transparent layer 230_W may range about 1.5:1 to about 2.5:1, and in detail, about 2:1. In detail, the green colorant included in the transparent layer 230_W may be in a range of about 6.8 wt % to 7.5 wt % for the transparent layer 230_W, and the blue colorant included in the transparent layer 230_W may be in a range of about 3.1 wt % to 3.46 wt % for the transparent layer 230_W.

The amount of the green colorant included in the transparent layer 230_W is smaller than the amount of the green colorant included in the green color filter 230_G, and the amount of the blue colorant included in the transparent layer 230_W is smaller than the amount of the blue colorant included in the blue color filter 230_B.

The transparent layer 230_W and the color filters 230_R, 230_G, and 230_B will be described later in detail.

The color filters 230_R, 230_G, and 230_B and the transparent layer 230_W may be elongated along the row or the column of the pixels PX_R, PX_G, PX_B, and PX_W. The color filters 230_R, 230_G, and 230_B and the transparent layer 230_W may include an opening 235 respectively positioned on the portion of the first and second drain electrodes 175H and 175L of the first and second thin film transistors QH and QL.

In each of the pixels PX_R, PX_G, PX_B, and PX_W, the upper surface of the color filters 230_R, 230_G, and 230_B and the transparent layer 230_W may be substantially flat.

According to another exemplary embodiment, the color filters 230_R, 230_G, and 230_B and the transparent layer 230_W may be positioned in the upper panel 200 rather than the lower panel 100.

A second insulating layer 180b may be further positioned on the color filters 230_R, 230_G, and 230_B and the transparent layer 230_W. The second insulating layer 180b may include the inorganic insulating material or the organic insulating material. The second insulating layer 180b as the overcoat for the color filters 230_R, 230_G, and 230_B and the transparent layer 230_W prevents the color filters 230_R, 230_G, and 230_B and the transparent layer 230_W from being exposed and may provide the flat surface. The second insulating layer 180b may prevent an impurity such as the colorant of the color filters 230_R, 230_G, and 230_B and the transparent layer 230_W from being inflowed into the liquid crystal layer 3. The second insulating layer 180b may be omitted.

The first insulating layer 180a and the second insulating layer 180b include a first contact hole 181H extending to and exposing a portion of the first drain electrode 175H and a second contact hole 181L extending to and exposing a portion of the second drain electrode 175L. The first and second contact holes 181H and 181L may be positioned in the opening 235 of the color filters 230_R, 230_G, and 230_B and the transparent layer 230_W.

A plurality of pixel electrodes are positioned on the second insulating layer 180b. One pixel electrode may be made of one electrode or may be made of a plurality of sub-pixel electrodes. According to an exemplary embodiment, one pixel electrode may include a first sub-pixel electrode 191H and a second sub-pixel electrode 191L.

The first sub-pixel electrode 191H may be positioned at the first sub-pixel PX_H, and the second sub-pixel electrode 191L may be positioned at the second sub-pixel PX_L. That is, the first sub-pixel electrode 191H and the second sub-pixel electrode 191L may be disposed to be separated upwardly and downwardly via the first and second thin film transistors QH and QL. However, the arrangement and the shape of the first sub-pixel electrode 191H and the second sub-pixel electrode 191L are not limited thereto and may be variously changed.

The entire shape of the first sub-pixel electrode 191H and the second sub-pixel electrode 191L may be a quadrangle. The first sub-pixel electrode 191H and the second sub-pixel electrode 191L include cross-shaped stems formed of transverse stems 193H and 193L and longitudinal stems 192H and 192L, a plurality of minute branches 194H and 194L extending from the cross-shaped stems to the outside, and protrusions 195H and 195L.

The first sub-pixel electrode 191H and the second sub-pixel electrode 191L may be divided into four sub-regions by the transverse stems 193H and 193L and the longitudinal stems 192H and 192L. The minute branches 194H and 194L obliquely extend from the transverse stems 193H and 193L and the longitudinal stems 192H and 192L, and the extending direction thereof may form an angle of approximately 45 degrees or 135 degrees with respect to the gate line 121 or the transverse stems 193H and 193L. The extending directions of the minute branches 194H and 194L of the adjacent sub-regions may be crossed.

The protrusion 195H of the first subpixel electrode 191H is connected to the first drain electrode 175H through the first contact hole 181H, and the protrusion 195L of the second subpixel electrode 191L is connected to the second drain electrode 175L through the second contact hole 181L. Accordingly, if the first thin film transistor QH and the second thin film transistor QL are turned on, the first subpixel electrode 191H and the second subpixel electrode 191L may receive the data voltage from the first drain electrode 175H and the second drain electrode 175L, respectively.

The first sub-pixel electrode 191H and the second sub-pixel electrode 191L may include a transparent conductive material such as indium-tin oxide (ITO), indium-zinc oxide (IZO), and a metal thin film.

In the present exemplary embodiment, the arrangement and the shape of the pixels PX_R, PX_G, PX_B, and PX_W, the structure of the thin film transistor, and the shape of the pixel electrode are only one example in the present exemplary embodiment, and numerous variations are possible.

Next, referring to the upper panel 200, a light blocking member 220 may be positioned on a substrate 210 including the insulating material such as glass and plastic. The light blocking member 220 may include a portion overlapping the first and second thin film transistors QH and QL, and may include a portion between the adjacent pixels PX_R, PX_G, PX_B, and PX_W. The light blocking member 220 may prevent the light leakage between the pixels PX_R, PX_G, PX_B, and PX_W or the light leakage between the first and second sub-pixels PX_H and PX_L. According to another exemplary embodiment, the light blocking member 220 may be positioned at the lower panel 100 rather than not the upper panel 200.

An overcoat 250 may be positioned on the light blocking member 220 and the substrate 210. The overcoat 250 prevents the light blocking member 220 from being exposed and may provide a flat surface. The overcoat 250 may prevent an impurity such as a pigment of the light blocking member 220 from flowing into the liquid crystal layer 3.

A common electrode 270 may be positioned on the overcoat 250. The common electrode 270 may be formed as a whole plate to have a planar shape on an entire surface of the substrate 210. The common electrode 270 may transmit a constant common voltage Vcom. The common electrode 270 may include the transparent conductive material such as ITO, IZO, and the metal thin film.

An alignment layer may be coated on the inner surfaces of two facing display panels 100 and 200. The alignment layer may be a vertical alignment layer. The alignment layer may be rubbed in at least one direction, and may be a photoalignment layer including a photoreactive material.

The liquid crystal layer 3 includes a plurality of liquid crystal molecules 31. The liquid crystal molecules 31 may have negative dielectric anisotropy, and may be aligned such that they are substantially perpendicular to the substrates 110 and 210 while no electric field is generated in the liquid crystal layer 3. The liquid crystal molecules 31 may be pretilted in predetermined directions when no electric field is generated in the liquid crystal layer 3. For example, the liquid crystal molecules 31 may be pretilted in directions that are substantially parallel to the minute branch portions 194H and 194L of the first and second subpixel electrodes 191H and 191L.

At least one polarizer (not shown) may be further positioned on the outer surface of the display panels 100 and 200.

The structure of the liquid crystal display described so far is one example, and the display device according to an exemplary embodiment may have various structures.

Figures 7, 8:
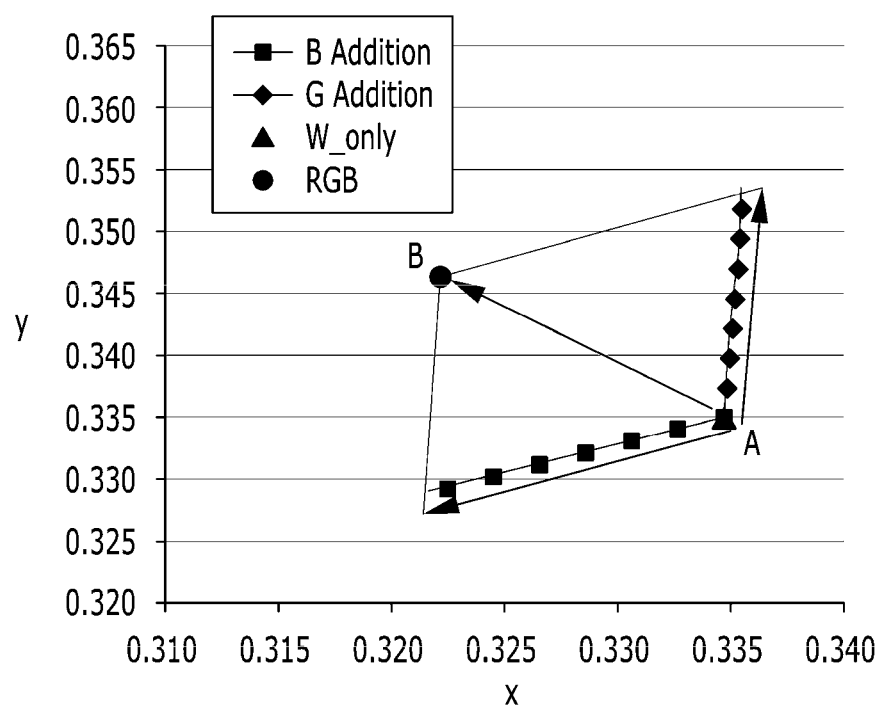
FIG. 7 is a graph showing white color coordinates represented by a white pixel when a transparent layer positioned at a white pixel of a display device does not include a colorant and white color coordinates represented together by a red pixel, a green pixel, and a blue pixel of a display device according to an exemplary embodiment.
FIG. 8 is a table showing white color coordinates represented by a white pixel when a transparent layer positioned at a white pixel of a display device according to an exemplary embodiment includes a green colorant and a blue colorant, white color coordinates represented together by a red pixel, a green pixel, and a blue pixel, and white color coordinates represented together by all pixels compared with white color coordinates represented by a white pixel when a transparent layer is positioned at a white pixel of a display device.

FIG. 7 is a graph showing white color coordinates represented by a white pixel when a transparent layer positioned at a white pixel of a display device does not include a colorant, and white color coordinates represented together by a red pixel, a green pixel, and a blue pixel of a display device according to an exemplary embodiment.

Here, color coordinates are an example of an x coordinate and a y coordinate of 1931 CIE XYZ color coordinates.

Referring to FIG. 7, when the transparent layer 230_W of the white pixel PX_W does not include the colorant (W_only), the white color coordinates (A) represented by the transparent layer 230_W has a difference from the white color coordinates (B) represented together by the color pixels PX_R, PX_G, and PX_B. Accordingly, if the transparent layer 230_W does not include the green colorant and the blue colorant, the white color coordinates (A) represented by the white pixel PX_W and the white color coordinates (B) represented by the color pixels PX_R, PX_G, and PX_B have the difference such that the desired color may not be represented.

Like an exemplary embodiment, if the green colorant is inserted in the transparent layer 230_W, the white color coordinates (A) represented by the transparent layer 230_W are moved upwardly along the y-axis direction as shown in FIG. 7. Also, if the blue colorant is added to the transparent layer 230_W, as shown in FIG. 7, the white color coordinates (A) represented by the transparent layer 230_W are moved in the left-lower direction along the x-axis direction as shown in FIG. 7. Accordingly, if two vectors of the arrows are added, the white color coordinates (A) represented by the transparent layer 230_W may substantially accord with the white color coordinates (B) represented by the color pixels PX_R, PX_G, and PX_B.

This will be described with reference to FIG. 8 along with FIG. 7.

FIG. 8 is a table showing white color coordinates represented by a white pixel when a transparent layer positioned at a white pixel of a display device according to an exemplary embodiment includes a green colorant, e.g., developer, and a blue colorant, white color coordinates represented together by a red pixel, a green pixel, and a blue pixel, and white color coordinates represented together by all pixels compared with white color coordinates represented by a white pixel when a transparent layer is positioned at a white pixel of a display device, Referring to FIG. 8 along with FIG. 7, the x-axis color coordinate of the white W_RGB represented by the color pixels PX_R, PX_G, and PX_B is 0.322, and the y-axis color coordinate is 0.346 as one example. If the transparent layer 230_W positioned at the white pixel PX_W does not include the green colorant and the blue colorant, the x-axis color coordinate of the white (W_only) represented by the white pixel PX_W may be 0.335, and the y-axis color coordinate may be 0.335. Compared with this, like the exemplary embodiment, if the transparent layer 230_W includes the green colorant and the blue colorant as well as the transparent organic material, the x-axis color coordinate of the white (W+GB) represented by the white pixel PX_W is changed to 0.322 and the y-axis color coordinate is changed to 0.346, thereby being in accord with the color coordinates of the white (W_RGB) represented together by the color pixels PX_R, PX_G, PX_B. For this, the ratio of the green colorant and the blue colorant added in the transparent layer 230_W and the ratio of the green colorant and the blue colorant for the entire transparent layer 230_W may be controlled, and in detail, as described above, the mass or the volume of the green colorant and the blue colorant included in the transparent layer 230_W may be about 2:1. In detail, the green colorant included in the transparent layer 230_W may be about 6.8 wt % to 7.5 wt % for the transparent layer 230_W, and the blue colorant included in the transparent layer 230_W may be about 3.1 wt % to 3.46 wt % for the transparent layer 230_W.

As described above, the color coordinates of the white (W_RGB) represented together by the color pixels PX_R, PX_G, and PX_B and the color coordinates of the white (W+GB) represented by the white pixel PX_W including the transparent layer 230_W including the green colorant and the blue colorant substantially accord with each other such that the x-axis color coordinate of the white (RGB+(W+GB) represented together by all pixels PX_R, PX_G, PX_B, and PX_W may be 0.322 and the y-axis color coordinate may be 0.346 as one example.

Next, the reason why the color coordinates of the white (W_RGB) represented together by the color pixels PX_R, PX_G, and PX_B and the color coordinates of the white (W+GB) represented by the white pixel PX_W including the transparent layer 230_W including the green colorant and the blue colorant substantially accord with each other will be described with reference to FIG. 9 to FIG. 14 according to an exemplary embodiment.

Figure 9:
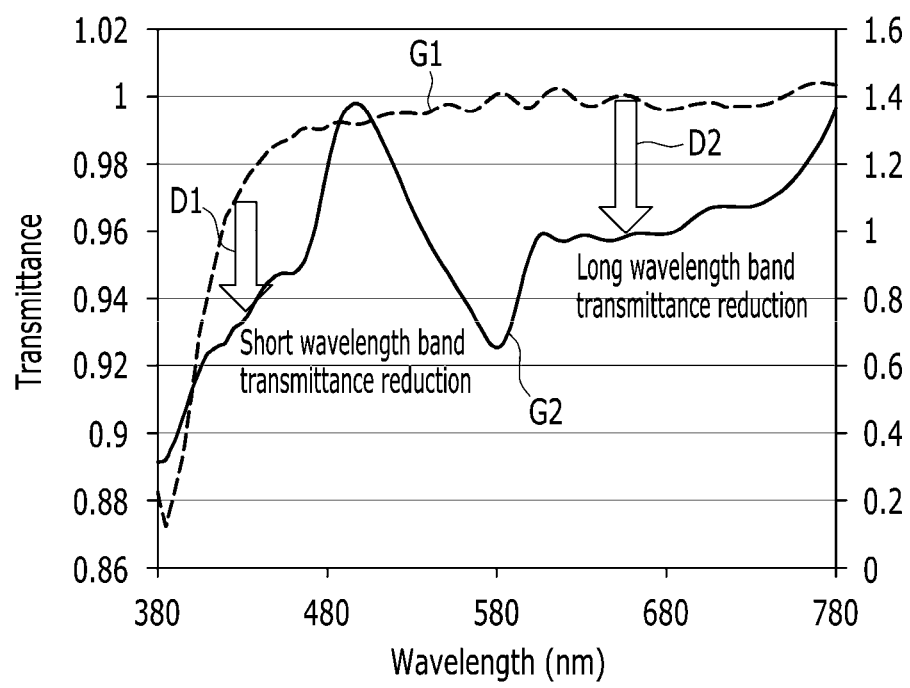
FIG. 9 is a graph showing transmittance according to wavelength of an image represented by a white pixel and transmittance according to wavelength of an image represented by a red pixel, a green pixel, and a blue pixel when a transparent layer positioned at a white pixel of a display device does not include a colorant.
Figure 10:
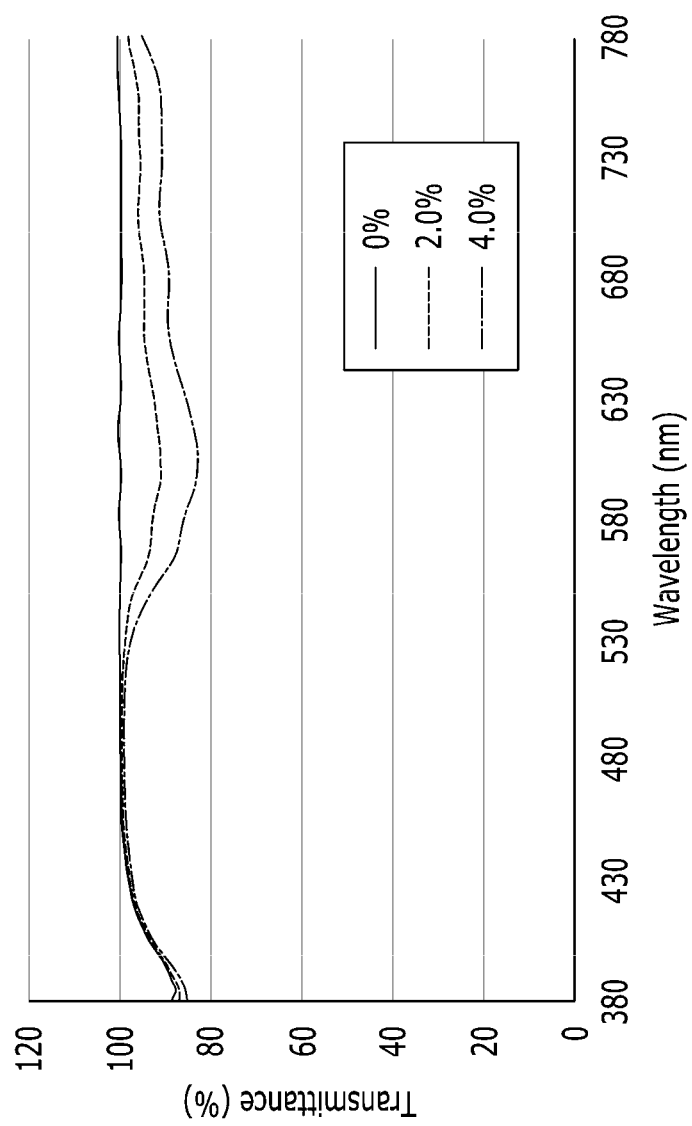
FIG. 10 is a graph showing transmittance according to wavelength of an image represented by a white pixel when a transparent layer positioned at a white pixel of a display device only includes a blue colorant.
Figure 11:
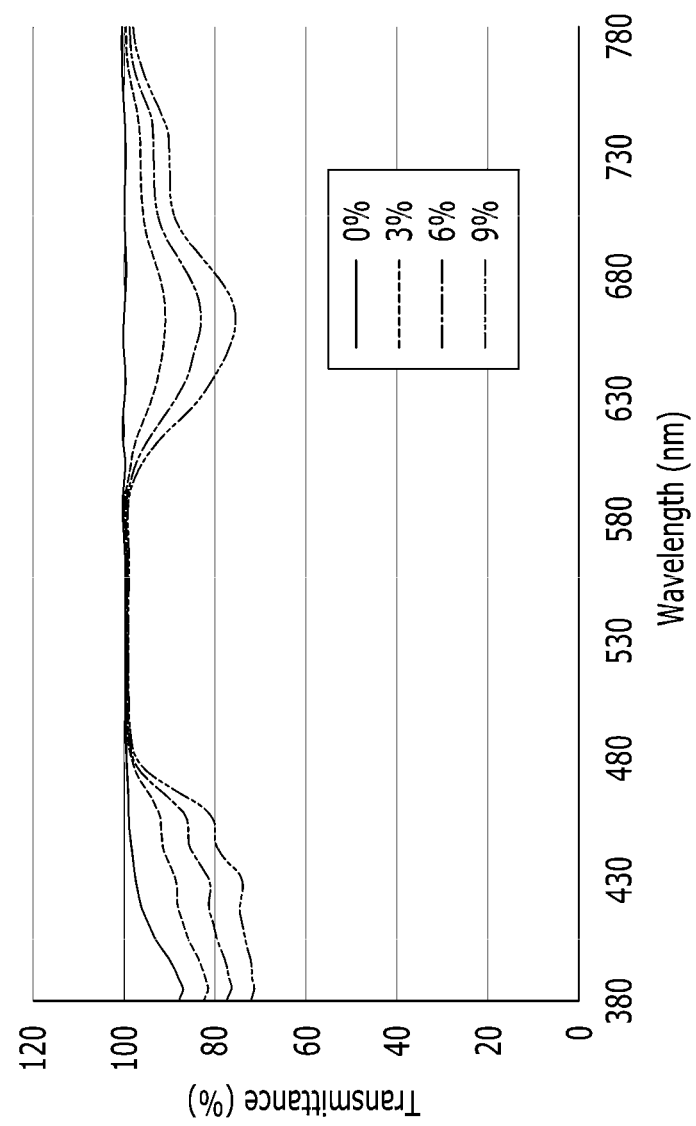
FIG. 11 is a graph showing transmittance according to wavelength of an image represented by a white pixel when a transparent layer positioned at a white pixel of a display device only includes a green colorant.

FIG. 9 is a graph showing transmittance according to wavelength of an image represented by a white pixel and transmittance according to wavelength of an image represented by a red pixel, a green pixel, and a blue pixel when a transparent layer positioned at a white pixel of a display device does not include a colorant. FIG. 10 is a graph showing transmittance according to wavelength of an image represented by a white pixel when a transparent layer positioned at a white pixel of a display device only includes a blue colorant. FIG. 11 is a graph showing transmittance according to wavelength of an image represented by a white pixel when a transparent layer positioned at a white pixel of a display device only includes a green colorant.

First, referring to FIG. 9, when the transparent layer 230_W of the white pixel PX_W does not include the colorant, the transmittance G1 of the light passing through the white pixel PX_W including the transparent layer 230_W is uniform for the entire wavelength, and the sharp transmittance reduction appears for a short wavelength among a visible rays region. In contrast, the transmittance G2 according to the wavelength of the white image represented together by the color pixels PX_R, PX_G, a PX_B is high for the wavelength band near 480 nm. Accordingly, to obtain the same color coordinates as the white represented together by the color pixels PX_R, PX_G, and PX_B through the white pixel PX_W including the transparent layer 230_W, it is necessary to decrease the transmittance in the short wavelength band of less than about 480 nm as indicated by an arrow D1 in FIG. 9 and the transmittance in the long wavelength of more than about 530 nm or 580 nm as indicated by an arrow D2.

Referring to FIG. 10, when the transparent layer 230_W of the white pixel PX_W only includes the blue colorant, it may be confirmed that the transmittance of the long wavelength band of more than about 530 nm among the entire wavelength band of the visible rays is decreased. The transmittance of the long wavelength band of more than about 530 nm is decreased as the ratio (wt %) of the blue colorant included in the transparent layer 230_W is increased.

Referring to FIG. 11, when the transparent layer 230_W of the white pixel PX_W includes the green colorant, it may be confirmed that the transmittance of the short wavelength band of less than about 480 nm among the entire wavelength band of the visible ray and the transmittance of the long wavelength band of more than about 580 nm are decreased. The transmittance is decreased as the ratio (wt %) of the green colorant included in the transparent layer 230_W is increased.

Accordingly, by increasing the green colorant and the blue colorant in the transparent layer 230_W of the white pixel PX_W and controlling the weight ratio thereof to accord with the white color coordinates represented by the white pixel PX_W including the transparent layer 230_W and the white color coordinates represented together by the color pixels PX_R, PX_G, and PX_B, the color quality of the image may be increased and the display quality may be improved. Resultantly, the color variation depending on the viewing angle of the display device is decreased such that the lateral visibility may be improved.

Figure 12:
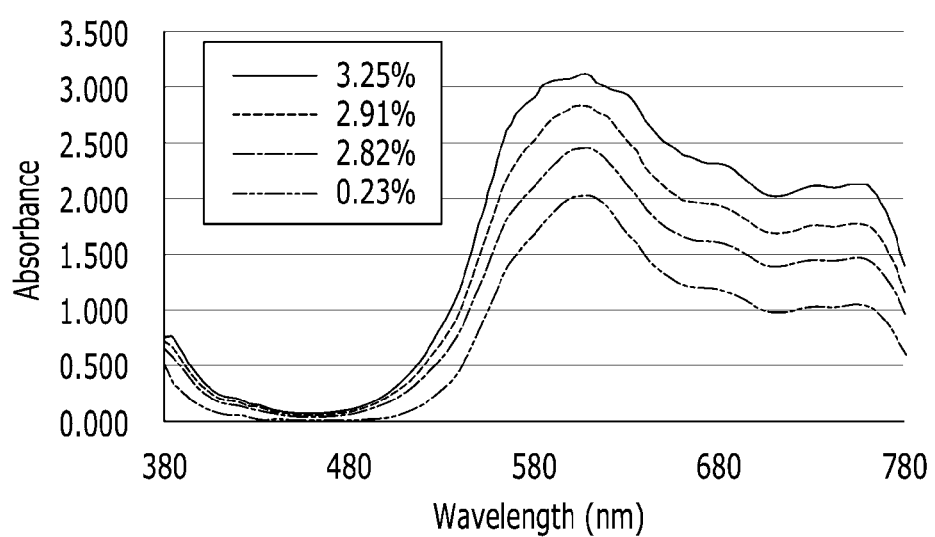
FIG. 12 is a graph showing an absorbance spectrum of a white pixel when a transparent layer positioned at a white pixel of a display device only includes a blue colorant.
Figure 13:
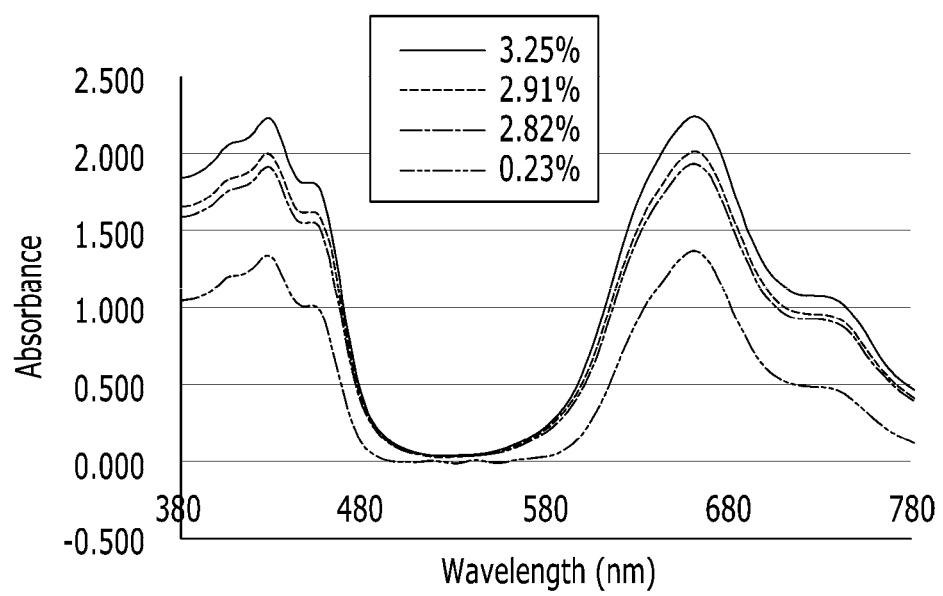
FIG. 13 is a graph showing an absorbance spectrum of a white pixel when a transparent layer positioned at a white pixel of a display device only includes a green colorant.
Figure 14:
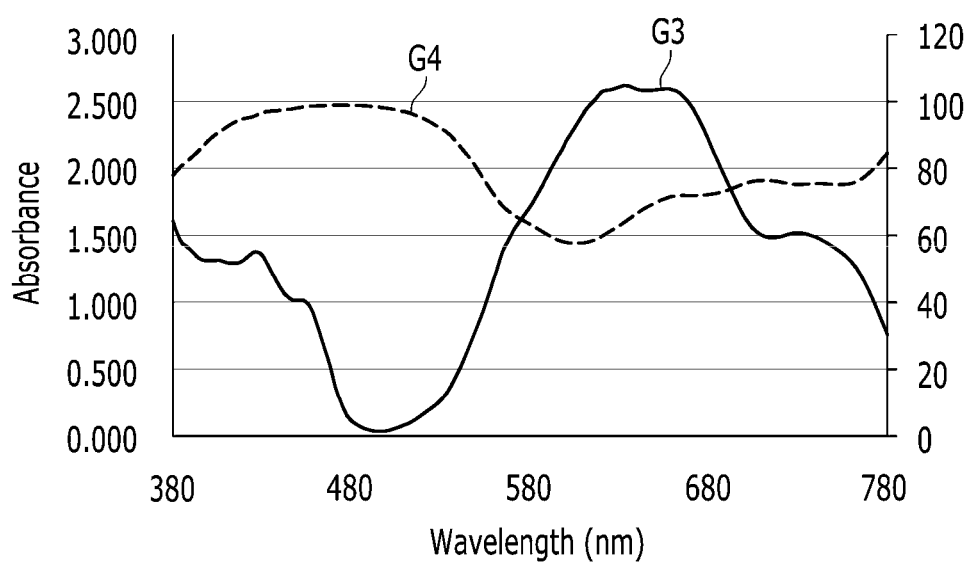
FIG. 14 is a graph showing an absorbance spectrum and transmittance of a white pixel when a transparent layer positioned at a white pixel of a display device according to an exemplary embodiment includes a green colorant and a blue colorant.

FIG. 12 is a graph showing an absorbance spectrum of a white pixel when a transparent layer positioned at a white pixel of a display device only includes a blue colorant. FIG. 13 is a graph showing an absorbance spectrum of a white pixel when a transparent layer positioned at a white pixel of a display device only includes a green colorant. FIG. 14 is a graph showing an absorbance spectrum and a transmittance of a white pixel when a transparent layer positioned at a white pixel of a display device according to an exemplary embodiment includes a green colorant and a blue colorant.

Referring to FIG. 12, when the transparent layer 230_W of the white pixel PX_W includes the blue colorant as shown in FIG. 12, it may be confirmed that the transparent layer 230_W absorbs the light of the long wavelength band of more than about 530 nm among the entire wavelength band of the visible rays, and this is opposite to the graph described in FIG. 10. The absorbance amount is increased as the ratio (wt %) of the blue colorant included in the transparent layer 230_W is increased.

Referring to FIG. 13, when the transparent layer 230_W of the white pixel PX_W only includes the green colorant, it may be confirmed that the transparent layer 230_W mainly absorbs light of the long wavelength band of more than about 580 nm among the entire wavelength band of the visible rays, and this is opposite to the graph of the described about FIG. 11. The absorbance amount is increased as the ratio (wt %) of the green colorant included in the transparent layer 230_W is increased.

Referring to FIG. 14, when the transparent layer 230_W of the white pixel PX_W includes the green colorant and the blue colorant, the absorbance spectrum G3 of the white pixel PX_W including the transparent layer 230_W largely absorbs the light of the short wavelength band of less than about 480 nm and the light of the long wavelength band of more than about 530 nm or 580 nm. Accordingly, the transmittance G4 of the white pixel PX_W may be substantially equal to the transmittance G2 according to the wavelength of the white image represented together by the color pixels PX_R, PX_G, and PX_B shown in FIG. 9 described above.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

DESCRIPTION OF SYMBOLS

3: liquid crystal layer
31: liquid crystal molecule
110, 210: substrate
121: gate line
124H, 124L: gate electrode
131: storage electrode line
140: gate insulating layer
154H, 154L: semiconductor
171H, 171L: data line
173H, 173L: source electrode
175H, 175L: drain electrode
180a, 180b: insulating layer
191H, 191L: sub-pixel electrode
220: light blocking member
230_R, 230_G, 230_B: color filter
230_W: transparent layer
250: overcoat
270: common electrode

What is claimed is:
1. A display device comprising:
a plurality of color filters positioned at a plurality of color pixels and representing different colors; and
a transparent layer positioned at a white pixel and including a green colorant and a blue colorant without including any red colorant,
wherein white color coordinates represented by the white pixel are substantially equal to white color coordinates represented together by the plurality of color pixels.
2. The display device of claim 1, wherein
a ratio of the green colorant and the blue colorant included in the transparent layer is about 1.5:1 to about 2.5:1.
3. The display device of claim 2, wherein
the green colorant included in the transparent layer ranges from about 6.8 wt % to 7.5 wt % of the transparent layer.
4. The display device of claim 3, wherein
the blue colorant included in the transparent layer ranges from about 3.1 wt % to 3.46 wt % of the transparent layer.

5. The display device of claim 4, wherein
the plurality of color filters include a red color filter representing red, a green color filter representing green, and a blue color filter representing blue,
an amount of the green colorant included in the transparent layer is smaller than an amount of a green colorant included in the green color filter, and an amount of the blue colorant included in the transparent layer is smaller than an amount of a blue colorant included in the blue color filter.

6. The display device of claim 5, further comprising:
a substrate and a plurality of signal lines positioned on the substrate,
wherein the plurality of color pixels and the white pixel each include at least one thin film transistor connected to the plurality of signal lines, and
the plurality of color filters and the transparent layer are positioned on the thin film transistors.

7. The display device of claim 5, further comprising:
a first substrate and a second substrate facing each other; and
a plurality of signal lines positioned on the first substrate,
wherein the plurality of color pixels and the white pixel each include at least one thin film transistor connected to the plurality of signal lines, and
the plurality of color filters and the transparent layer are positioned on the second substrate.

8. The display device of claim 1, wherein
the green colorant included in the transparent layer ranges from about 6.8 wt % to 7.5 wt % of the transparent layer.

9. The display device of claim 8, wherein
the blue colorant included in the transparent layer ranges from about 3.1 wt % to 3.46 wt % of the transparent layer.

10. The display device of claim 9, wherein
the plurality of color filters include a red color filter representing red, a green color filter representing green, and a blue color filter representing blue,
an amount of the green colorant included in the transparent layer is smaller than an amount of a green colorant included in the green color filter, and an amount of the blue colorant included in the transparent layer is smaller than an amount of a blue colorant included in the blue color filter.

11. The display device of claim 10, further comprising:
a substrate and a plurality of signal lines positioned on the substrate,
wherein the plurality of color pixels and the white pixel each include at least one thin film transistor connected to the plurality of signal lines, and
the plurality of color filters and the transparent layer are positioned on the thin film transistors.

12. The display device of claim 10, further comprising:
a first substrate and a second substrate facing each other; and
a plurality of signal lines positioned on the first substrate,
wherein the plurality of color pixels and the white pixel each include at least one thin film transistor connected to the plurality of signal lines, and
the plurality of color filters and the transparent layer are positioned on the second substrate.

13. The display device of claim 1, wherein
the blue colorant included in the transparent layer ranges from about 3.1 wt % to 3.46 wt % of the transparent layer.

14. The display device of claim 13, wherein
the plurality of color filters include a red color filter representing red, a green color filter representing green, and a blue color filter representing blue,
an amount of the green colorant included in the transparent layer is smaller than an amount of a green colorant included in the green color filter, and an amount of the blue colorant included in the transparent layer is smaller than an amount of a blue colorant included in the blue color filter.

15. The display device of claim 14, further comprising:
a substrate and a plurality of signal lines positioned on the substrate,
wherein the plurality of color pixels and the white pixel each include at least one thin film transistor connected to the plurality of signal lines, and
the plurality of color filters and the transparent layer are positioned on the thin film transistors.

16. The display device of claim 14, further comprising:
a first substrate and a second substrate facing each other; and
a plurality of signal lines positioned on the first substrate,
wherein the plurality of color pixels and the white pixel each include at least one thin film transistor connected to the plurality of signal lines, and
the plurality of color filters and the transparent layer are positioned on the second substrate.

17. The display device of claim 1, wherein
the plurality of color filters include a red color filter representing red, a green color filter representing green, and a blue color filter representing blue,
an amount of the green colorant included in the transparent layer is smaller than an amount of a green colorant included in the green color filter, and an amount of the blue colorant included in the transparent layer is smaller than an amount of a blue colorant included in the blue color filter.

18. The display device of claim 17, further comprising:
a substrate and a plurality of signal lines positioned on the substrate,
wherein the plurality of color pixels and the white pixel each include at least one thin film transistor connected to the plurality of signal lines, and
the plurality of color filters and the transparent layer are positioned on the thin film transistors.

19. The display device of claim 17, further comprising:
a first substrate and a second substrate facing each other; and
a plurality of signal lines positioned on the first substrate,
wherein the plurality of color pixels and the white pixel each include at least one thin film transistor connected to the plurality of signal lines, and
the plurality of color filters and the transparent layer are positioned on the second substrate.

* * * * *